United States Patent Office

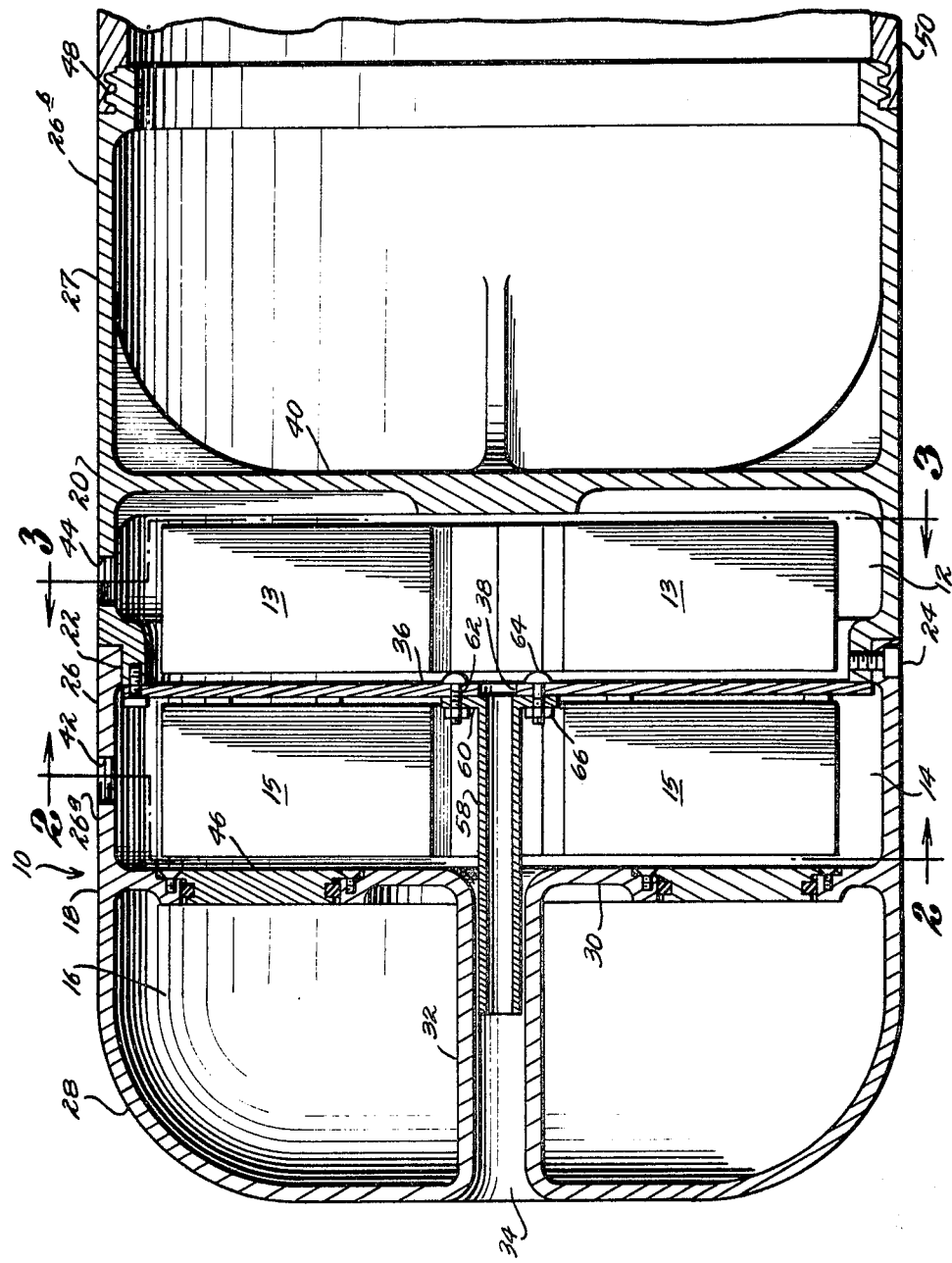

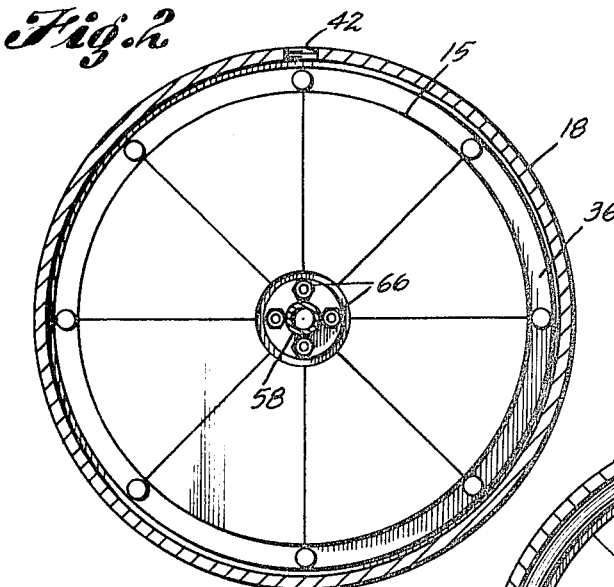
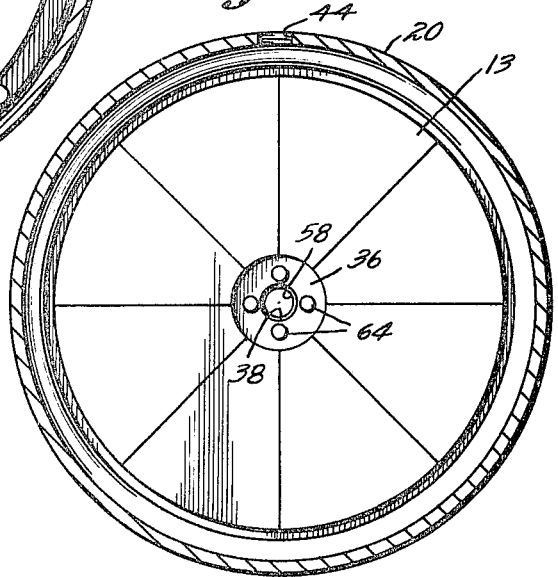
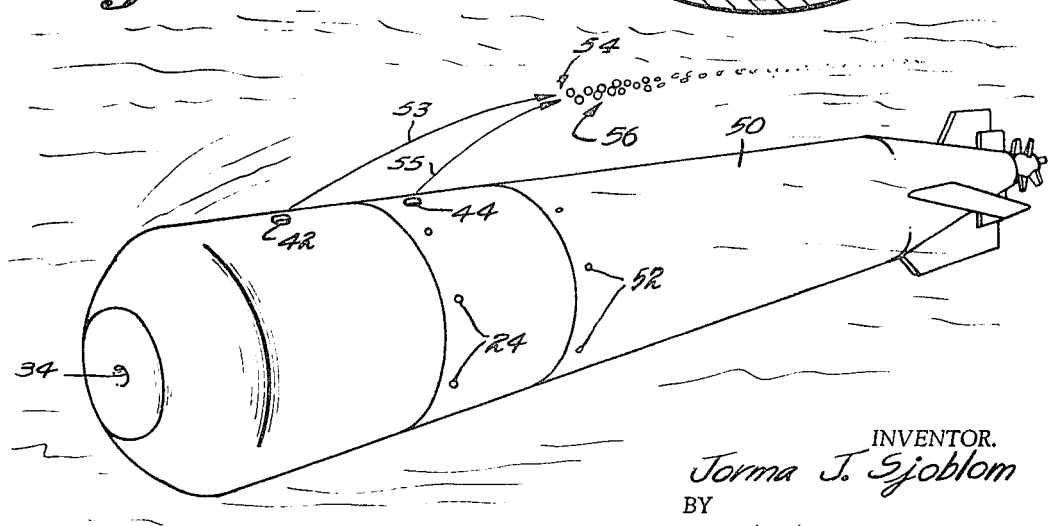

3,433,196
Patented Mar. 18, 1969

---

3,433,196
SUBMARINE WAKE SIMULATION GENERATING SYSTEM FOR SELF-PROPELLED SUBMARINE TARGET
Jorma J. Sjoblom, Huntington, N.Y., assignor, by mesne assignments, to the United States of America as represented by the Secretary of the Navy
Filed Dec. 16, 1966, Ser. No. 602,417
U.S. Cl. 114—67           7 Claims
Int. Cl. B63b 1/34, 35/28

---

ABSTRACT OF THE DISCLOSURE

A wake simulation generating system for attachment to an elongated self-propelled submersible submarine target. The apparatus includes a chemical content of a metal hydride and acid salt selected for efficiency in use, uniform production of hydrogen bubbles in both fresh and salt water on a desired volumetric basis, and a delivery means in the form of a housing of minimum size with selective detachable tubular means for varying the flow of water over the chemicals to adjust the system to variations in water temperature and hence to variations in operational water depth. The chemical material is also selected to have the characteristic of smooth reaction with sea water, long shelf life, safe handling, chemical density similar to water and to produce a wake having passive reaction to sonar detection.

---

PRIOR ART

Prior attempts to provide a satisfactory wake generating system have failed to satisfy one or more of the above required characteristics. In particular iron magnesium pills have been employed with unsatisfactory results from the standpoint of sufficient rapidity of reaction to produce the required volume of hydrogen bubbles. Immersed silica gel have been used producing a crackling noise and is found not satisfactory since it does not provide a passive object of sonar detection.

SUMMARY OF THE INVENTION

In the present invention there is combined chemicals including a solid metal hydride with the metal having an atomic weight in the range of 7 to 23 and an acid salt of the solid bisulphate class having metal constituent in the range of 7 to 40 atomic weight with a compartmented housing for separately containing the chemicals and selectively variable passageway forming means for selectively controlling the total volume of water flow across the chemicals and the relative volume of water flow across each chemical to a common mixing area for the production of hydrogen bubbles.

Other objects and advantages will appear from the following description of an example of the invention when considered in connection with the accompanying drawings, and the novel features will be particularly pointed out in the appended claims.

In the drawings:
FIGURE 1 is a cross-sectional view of a housing and chemicals positioned therein forming a wake generating system incorporating the invention;
FIGURES 2 and 3 are cross-sectional views taken on lines 2—2 and 3—3 of FIGURE 1, and FIGURE 4 is a perspective view of the wake generating system of FIGURE 1 as attached to a submersible, propelled submarine target showing the development of a hydrogen bubble wake.

Referring to the drawings, there is shown in FIGURE 1 a housing indicated generally at 10 for supporting in separate chambers 12 and 14 a metal hydride and an acid salt and providing in the forward end thereof a buoyant chamber 16.

The housing, as will be seen in FIGURE 1, is formed of a forward nose piece portion 18 of substantially cylindrical outer periphery and a mating attachment piece 20 joined at a dovetail joint 22 by screws 24 or other suitable means, to provide a cylindrical side wall 26 having a front extremity 26a and a rear extremity 26b. A curved and centrally apertured front wall 28 and a radial centrally apertured first intermediate wall 30 are joined integrally by a tubular section 32 to form a centrally disposed passageway 34 for the admission of water and to enclose the buoyant chamber 16. A second intermediate wall 36 radially disposed and centrally apertured as at 38 is provided to define in conjunction with a rear closing wall 40 the chemical storage chambers 12 and 14. Outlet passageways are provided by apertures 42 and 44 to pass water from the chambers 14 and 12 to a common mixing area outside the cylindrical wall 26. The closing wall 40 is spaced from the rear extremity 26b of the cylindrical wall 26 to provide flanged or skirt means 27 for attaching the housing to its associated submarine target.

Preferably the wall 30 is provided with a removable sealable closure as indicated at 46 to add or remove ballast material from the buoyant chamber as required for the depth of target run.

The chemicals provided in accordance with the subject invention are a solid metal hydride indicated at 15 with the metal having an atomic weight in the range of 7 to 23 as the active material and an acid salt indicated at 13 of the solid bisulphate class having a metal constituent in the range of 7 to 40 atomic weight.

The presently preferred metal hydride is sodium borohydrate. The metal hydride can be stabilized for storage by the use of a 1 to 2% sodium hydroxide in water used for casting the active metal hydride with water. However, it is presently preferred to press cast the active material into centrally apertured disc cakes utilizing a metal hydride in powder form with an alkaline salt in powder form, the two being press cast together to form a solid cake. The alkaline salt is selected from the classes of phosphates, borates and carbonates. The ratio of the chemical components in the solid cake is about two parts of metal hydride to one part of alkaline salt stabilizer.

The activating material, i.e. an acid salt of the solid bisulphate class in powder form, is heated to melted liquid condition and poured into a cylindrical glass vessel lined with Teflon, greased with silicone to provide a melt cast product.

A suitable water-soluble wax, for example Carbowax 4000 or 1540, is provided for coating the chemical cakes in order to delay their dissolving and reaction in water.

As shown in FIGURES 2 and 3, the cakes 13 and 15 of active and activating chemicals are formed in pie shaped sections of an apertured disc to provide increased surface exposure to water and to provide water passages through the caked material.

Referring to FIGURES 1 and 4, the rearward, skirt portion 27, of the housing 10 is formed with a threaded joint 48 by which it is mated to the nose end of the submersible target 50 and secured thereto by set screws 52.

In the wake generating system as thus far described (see FIGURES 1 and 4) as the housing 10 is propelled through the water by the self-propelled target 50 water enters the passageway 34, flows across the caked chemical materials in the chambers 14 and 12 and exits as separate solutions of metal hydride and acid salt through respective exit passageways 42 and 44 and along the paths indicated by the arrows 53 and 55 to combine in a common mixing area 54 adjacent the exit port 44 thereupon generating a wake of hydrogen bubbles as indicated at 56 in FIGURE 4.

The subject wake generating system is intended for operation to a depth of 125 feet in salt water and for dispersion of hydrogen produced at a rate of 100 liters per minute for 30 minutes with average bubble size between .01 and .05 centimeters in diameter. The total weight of phosphated sodium borohydride recommended for total generation of 300 liters of hydrogen is 1800 grams. The total weight of ammonium bisulphate recommended in an equal volume basis to the sodium borohydride is 2900 grams. The total quantities of chemicals mentioned above, contained in separate dissolving chambers, are recommended to be flushed with water at a rate of 2.5 g.p.m. at a temperature of 70° F. The passageways dimensions in the housing 10 are thus selected in relation to the intended run speed of submersible target to provide the desired gallons per minute flow rate of water.

It is to be noted, however, that the wake generation process is sensitive to a minor degree to the hydrogen ion content of the water at the run depth and to a major degree to water temperature because the dissolving rates for the chemicals are increased by increasing temperature. Hence, the potential volume of gas per unit volume of water becomes greater. The wake may therefore become too intense and short-lived at higher water temperatures unless means are provided to adjust water flow rate in relation to water temperature.

Thus, in accordance with an aspect of the subject invention means is provided to adjust total water flow rate to the chemicals and to adjust relative rate of flow across the respective chemicals.

More specifically, as shown in FIGURE 1, a detachable flow control tube 58 is provided. The tube 58 is provided with suitable means as for example a flange 60 having aperture 62 by which the tube 58 can be detachably mounted to the plate 36 concentric with the aperture 38 in plate 36 by screws 64 and nuts 66. The forward end of the tube 58 projects as indicated into the inlet passageway 34 of housing 10. The tube 58 is selectively dimensioned as to its internal and external diameters to provide a selected total rate of water flow and a selected relative rate of water flow across the chemicals housed in the respective chambers 14 and 12. A plurality of tubes 58 of various selected dimensions are maintained for selection of the proper tube for particular water conditions.

It is believed that the above described wake generating system satisfies each of the objectives previously defined hereinabove. In particular the system provides maximum efficiency in hydrogen wake generation, with minimum size of device; uniform production of wake strength in a passive mode of suitable intensity for proper wake stimulation and for a satisfactory run period; and means for adjusting the system for varying ambient water conditions.

It will be understood that various changes in the details, materials, and arrangements of parts, which have been herein described and illustrated in order to explain the nature of the invention, may be made by those skilled in the art within the principle and scope of the invention.

It is claimed:

1. A wake generating system for an elongated propelled submersible submarine target comprising:
   (a) a metal hydride with the metal having an atomic weight of 7 to 23,
   (b) an acid salt of the bisulphate class having metal constituent in the range of 7 to 40 atomic weight,
   (c) a hollow compartmented housing means having separate compartments for separately containing said hydride and acid salt,
   (d) means for attaching said housing to said target and means forming passageways in said housing for directing outside water through said housing and over said hydride and salt in said compartments in predetermined proportionate separate flow volumes and including means for directing the outlet flow through said housing to a mixing area adjacent the outer periphery of said housing.

2. A wake generating system according to claim 1, including,
   (a) an alkaline salt selected from the group consisting of phosphates, borates and carbonates,
   (b) said hydride and alkaline salt being press cast to solid disk-shaped, centrally apertured cakes in the approximate ratio of two parts metal hydride to one part alkaline salt to stabilize said hydride for storage.

3. A wake generating system according to claim 2,
   (a) said acid salt being melt-cast to form disks of solid acid salt centrally apertured.

4. A wake generating system according to claim 3,
   (a) said hollow compartmented housing having a cylindrical side wall having a front and rear extremity together with a curved centrally apertured front wall, a rear closing wall and a first and second centrally apertured intermediate wall, defining between said walls a bouyant chamber and two chemical storage chambers,
   (b) a centrally disposed tubular section joining said front wall and first intermediate wall adjacent said apertures to close said bouyant chamber and define a central passageway for admitting water to said chemical storage chambers,
   (c) each of said chemical chambers having an outlet passageway in said cylindrical side wall to pass water to a common mixing area adjacent the outer periphery of said cylindrical wall,
   (d) said rear wall being spaced from said rear extremity of said side wall to provide a security skirt for attaching said housing to the submarine target.

5. A wake generating system according to claim 4,
   (a) said housing including a flanged tubular flow divider means having a forward end positioned in said elongated central passageway and its flanged end fixed to said dividing wall concentric with its apertured portion.

6. A wake generating system according to claim 5,
   (a) said flow divider being detachably connected to said divider wall and selected in internal and external diameters to selectively control the total rate of flow to said chemicals and the proportionate rate of flow to said chemicals by the selection of internal and external diameter of said tubular divider.

7. A wake generating system according to claim 6,
   (a) said disk shaped chemical solids being formed in wedge shaped sections for assembly in said housing.

References Cited

UNITED STATES PATENTS

| | | | |
|---|---|---|---|
| 3,196,823 | 7/1965 | Thurston | 114—67.1 |
| 3,205,846 | 9/1965 | Lang | 114—67.1 |
| 3,230,919 | 1/1966 | Crawford | 114—67.1 |
| 3,286,674 | 11/1966 | Thompson et al. | 114—67.1 |
| 3,303,811 | 2/1967 | Giles | 114—67.1 |

LOUIS R. PRINCE, *Primary Examiner.*

D. M. YASICH, *Assistant Examiner.*

U.S. Cl. X.R.

116—26